Aug. 25, 1936.    H. CHRISTIANSEN    2,051,821
POWER OPERATED SHUNTING GEAR FOR ROLLING STOCK
Filed March 13, 1934    6 Sheets-Sheet 1

Aug. 25, 1936. H. CHRISTIANSEN 2,051,821
POWER OPERATED SHUNTING GEAR FOR ROLLING STOCK
Filed March 13, 1934   6 Sheets-Sheet 4

Inventor:
Heinrich Christiansen
by his Attorney.

Aug. 25, 1936.   H. CHRISTIANSEN   2,051,821
POWER OPERATED SHUNTING GEAR FOR ROLLING STOCK
Filed March 13, 1934   6 Sheets-Sheet 5

Patented Aug. 25, 1936

2,051,821

UNITED STATES PATENT OFFICE 2,051,821

POWER OPERATED SHUNTING GEAR FOR ROLLING STOCK

Heinrich Christiansen, Altona, Germany

Application March 13, 1934, Serial No. 715,272
In Germany March 17, 1933

7 Claims. (Cl. 105—141)

Various means have been proposed for solving the problem of providing a power driven shunting gear or car busher for rolling stock. For example, machines of the kind having at least two axles adapted to run on the rails and driven by an electric motor or an internal combustion engine have been tried. These are expensive and cannot be utilized everywhere without providing a complicated rail system, since they are bound to the rails. Tractors with power drives running by the side of the rails have also been utilized. These can only be operated if a proper runway is provided alongside the rail track. Devices acting directly upon the car wheel by friction rollers or with the aid of levers operating after the fashion of crow-bars have also been proposed. These are very difficult to apply and to transfer from place to place; often they do not possess sufficient driving power or cause damage to the car wheels and the rails.

Further, it has been proposed to provide a device having several wheels running on a rail and acting upon the car by means of a push bar. Such a device is heavy and difficult to shift or transfer from one place of application to another. Moreover, it is exceedingly difficult to cause the device to mount the rail, and it is almost impossible to apply it between two cars which, after the coupling has been released, stand close to one another.

As distinct from these known arrangements the present invention provides a power driven shunting gear or car pusher for rolling stock which can be easily transferred from one place of application to another, can be mounted between two cars, is simple to handle and is capable of satisfactorily effecting the shunting operation without causing damage to the car wheels or the rails.

According to this invention a shunting gear for rolling stock and of the type adapted to run on the rail is characterized by a power driven driving wheel which also acts as a carrier or transport wheel.

Preferably, a casing wherein the driving wheel is mounted and which is rockable round the axis thereof, is provided with a push bar which may be fixedly attached to the casing in such manner as to increase sufficiently the frictional contact pressure of the driving wheel when acting upon the car to be shunted. The length of said push bar may be adjustable by hand or automatically according to the particular conditions of operation.

The casing may be provided with guiding and controlling handles so arranged that the operator is always clear of the standard or loading profile while steering the gear.

Conveniently the casing is equipped with guiding and controlling handles adjustable and lockable in a horizontal plane relatively to the driving wheel, so that same may be operated by means of a single steering arrangement both during transfer from one place of application to another (when the operator walks behind the driving wheel) and during the shunting operations (when the operator is by the side of the driving wheel which then runs on the rail).

The reduction of the shunting gear to exceedingly small dimensions, so that it may be mounted between two cars standing close together, is made possible by the feature that the complete change speed gear, which can be operated by means of an appropriate handle, is disposed within the driving and carrier or transport wheel.

Another feature of the invention is the provision on the casing or on a frame connected thereto of means disposed directly in front of the wheel for facilitating the mounting or "climbing" of the shunting gear on the rail. In addition to the driving wheel an auxiliary wheel may be provided for the purpose of temporarily supporting the gear during the mounting operation. Furthermore, auxiliary means more particularly described hereinafter may be provided for preventing the driving wheel from overriding the rail during mounting or from being derailed due to inattentive operation, and for other purposes.

In the accompanying drawings some preferred embodiments of the invention are illustrated by way of example, in more or less diagrammatic representation.

Referring to Figs. 1 to 8 the reference number 1 indicates a frame work provided at one end with a cross or handle bar 2 with handles 2a for holding and guiding the shunting gear and a wheel 3 rotatably supported by arms 3' of the frame work at the end opposite to the said cross bar. This wheel will be referred to for convenience as auxiliary wheel. 4 is an annular part of the said frame work 1 located between the frame portions 2 and 3' and rotatably supporting by means of rollers 5 a ring 6. 7 is a helmet-shaped casing rotatably supported in this ring, and 8 is an internal combustion engine rigidly attached to the said casing 7 and including a crank shaft 17 (Fig. 8). 7' is a casing enclosing a speed varying gear to be described later on in detail and comprising a driving shaft 19 permanently coupled to the crank shaft 17 by any well-known form of an elastic or frictional clutch 18 shown e. g. in Fig. 8 as a well-known type of spring plate clutch. The casing 7 is provided with cylindrical inwardly directed rims 7a, 7b, concentric to the axis of shafts 17 and 19, and the casing 7' is provided with outwardly directed similar rims 7a', 7b', both casings being rigidly connected by means of these parts 7a', 7b' respectively in any conventional manner not shown here. The outer cylindrical faces of these rims 7a, 7a', 7b, 7b' form bearings for a hub-like part 9 of a wheel 10 to be called the main or driving wheel. This wheel comprises two dished disc-like parts 10' arranged between the walls of the casings 7 and 7', and enclosing the latter casing, and a rim part 10'' supporting a wide elastic tyre 11 preferably made of solid rubber. The tyre may comprise a plurality of conventional interchangeable segments (not shown). The tread of the tyre is preferably so constructed as to assist the running on the rail, as well as the mounting and adhesion thereon. In the example tooth-like projections 11' are shown in an exaggerated scale.

The common axis of the rings 4 and 6 intersects with the common axis of the shafts 17, 19 and the main wheel 10 at right angles and remains vertical or nearly so in the normal use of the shunting gear, whereas the common axis of the shafts 17, 19 and main wheel 10 remains under the same operating conditions substantially horizontal.

Figures 1, 5:
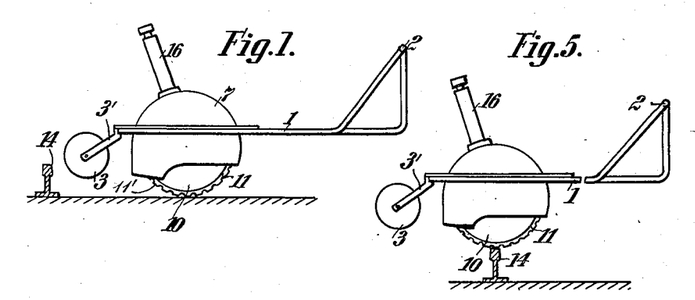
Figs. 1, 3, 4, and 5 show various phases of mounting the shunting gear upon a rail.
Figure 2:
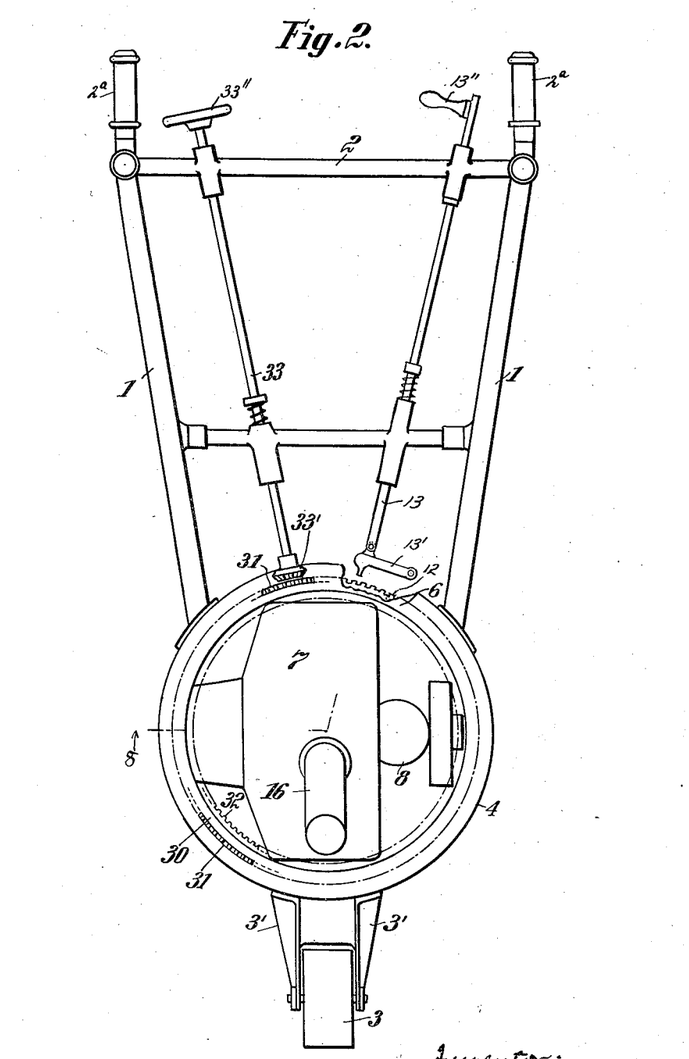
Fig. 2 is a plan view of the shunting gear in larger scale, parts being broken away.

30 is a ring concentrically arranged within ring 6 and rotatably supported in ring 6 by a race of rollers 6', ring 30 being provided with an outer toothed rim 31 and an inner toothed rim 32. By means of a control shaft 33 rotatable by hand wheel 33'' mounted close to handle bar 2 (Fig. 2), a pinion 33' may be temporarily brought into engagement with toothed rim 31 and after this has been done, by rotating the shaft 33 the ring 30 may be rotated relative to the ring 6 when the latter is held stationary for the purposes to be described later on. Normally, however, ring 6 participates in a rotation of the ring 30, for instance by frictional engagement. Any suitable means not shown here may be provided for causing such friction and for securing such normal participation. For holding ring 6 stationary the latter is provided with a toothed rim 12 with which is engageable a locking pawl 13' pivotally attached to a stud on frame 4 (Fig. 2). To this pawl is attached an operating bar 13 guided in frame 1 and provided with a handle 13'', arranged close to the handle bar 2. When bar 13 is longitudinally operated in one direction pawl 13' is clear of toothed rim 12, and ring 6 may rotate with ring 30 when the latter is operated as aforedescribed. When bar 13 is operated in the other direction, pawl 13' engages rim 12 and locks ring 6 to frame 4, and if now ring 30 is rotated it rotates alone and relatively to ring 6 for the purpose to be described later.

Figure 8:
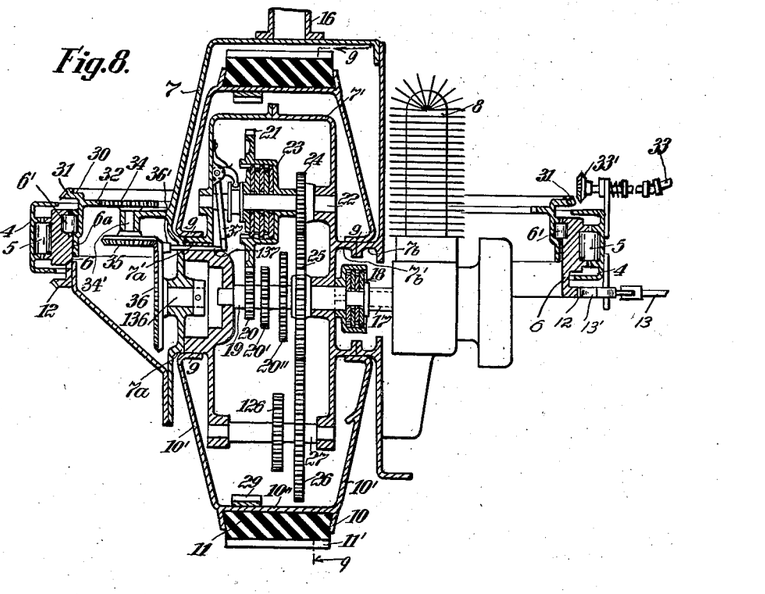
Fig. 8 is a diagrammatic representation, in section and on a larger scale, of the driving wheel, each section being taken through the gearing according to line 8—8 in Fig. 2, and drawn in a larger scale, indicating means for performing the relative rotation.
Figure 9:
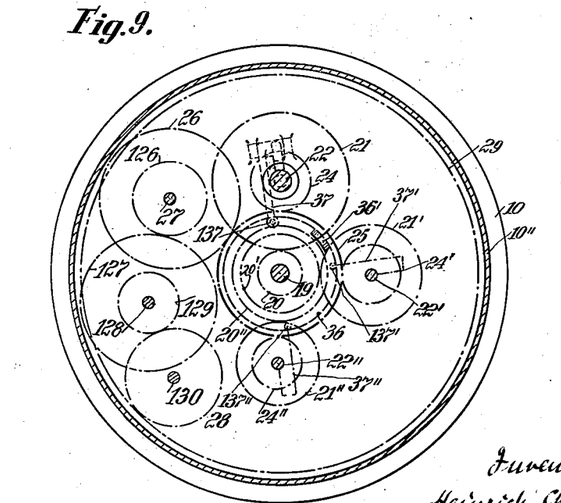
Fig. 9 is a diagrammatic side view, partly in section on line 9—9, Fig. 8, of the change speed gear for transmitting the drive from the engine shaft to the driving wheel of the shunting gear, as viewed from the left of Fig. 8.

The driving wheel 10 may be driven by the crank shaft 17 of the internal combustion engine 8 by a speed varying gear enclosed in the casing 7' (see Figs. 8 and 9). This speed varying gear comprises three spur wheels 20, 20', 20'' rigidly fixed upon the above-mentioned driving shaft 19 arranged concentrically to the main wheel 10. The spur wheel 20 is in constant mesh with a spur wheel 21 which is freely rotatable on a shaft 22 supported by bearings in the wall of the gear casing and having fixed to it a spur wheel 24 which is in constant mesh with a spur wheel 25 which in turn is freely rotatably on the driving shaft 19. A clutch 23 of any well-known construction and shown as a so-called disk clutch in Fig. 8, and to be actuated by a bell crank lever 37 pivotally supported by the casing 7', is arranged to couple at will the spur wheel 21 with the shaft 22 and thus with wheel 24.

The spur wheel 25 is in continuous mesh with a spur wheel 26 rigidly fixed upon a shaft 27 supported by bearings in the casing 7', and having a second spur wheel 126 rigidly fixed to it. This latter wheel in turn meshes with a spur wheel 127 fixed upon a shaft 128 supported by the casing 7', and a further spur wheel 129 fixed upon this shaft is in mesh with a spur wheel 28 fixed on a shaft 130. The wheel 28 meshes also with an internally toothed ring 29 fixed to the rim of the main wheel 10.

It is easily understood that with the clutch 23 in operative position the power from driving shaft 19 driven by the engine 8 is transmitted to the wheel 10, the spur wheel 20 then driving, through wheel 21 clutch 23 shaft 22 and wheel 24, the wheel 25 which is permanently coupled with drive ring 29 by means of the gearing 26, 126, 128, 28, aforedescribed.

In the gear casing 7' two further shafts 22' and 22'' are supported parallel to the shaft 22. The radial distance of these shafts from the driving shaft 19 is the same as that of the shaft 22, and the constructional arrangement of these further shafts substantially corresponds to that of shaft 22; they have rigidly fixed to them spur wheels 24′ and 24″ respectively continuously meshing with wheel 25, and freely rotating wheels 21′, 21″, continuously meshing with wheels 20′ and 20″ respectively, which by radially disposed bell crank levers 37′ or 37″ only indicated by dash-dot lines and clutches (not shown) such as 23 may be coupled with their respective shafts 22′ or 22″. According to whether one or the other clutch bell crank 37, 37′ or 37″ is actuated one or the other of the spur wheel trains 20, 21, 24, 25 or 20′, 21′, 24′, 25′ or 20″, 21″, 24″, 25″ will transfer the power of the engine to the wheel 10 and the latter may therefore be driven at any one of three different transmission ratios.

In coaxial alignment with the shaft 19 a stub shaft 136 is supported by the casing 7 upon which a bevelled gear 36 is fixed engaging a bevelled gear 35 fixed to the shaft 34′ of a spur wheel 34 engaging the internally toothed rim 32 of the ring 30. By rotating the ring 30 by the above-described means relative to the ring 6 the wheels 30, 34, 35, 36 will be rotated as well. The side of the wheel 36 facing toward the casing 7 is provided with a control cam 36′ which upon rotation of the wheel 36 moves in a circular path around the axis of the shafts 19, 136 and meets a bar 137 slidably supported in the casing and being in continuous contact with the clutch lever 37 (see Fig. 8). This cam 36′ upon rotation of gear 36 meets and operates similarly arranged bars 137′, 137″ (Fig. 9) cooperating respectively with bell crank levers 37′ and 37″ aforementioned. If the bell crank lever 37 or one of the levers 37′, 37″ is actuated by the cam 36′, the toothed wheel 21 or one of the wheels 21′, 21″ is clutched with its shaft 22, 22′, and 22″ respectively, and so according to the position of the cam 36′ relatve to the levers 37, 37′, 37″ one of the three gear connections for instance 20, 21, 24, 25 or 20′, 21′, 24′, 25′, is made operative and thereby one of the three transmission ratios of the speed varying gear for the wheel 10 is established. No special reverse gear is necessary as the ring 6 with the casing 7 and wheel 10 may be rotated around the vertical axis of the ring 4 and the frame 1 through any desirable angle. A rotation by 180° obviously has the result of driving the shunting gear in the opposite direction.

When it is desired to move the shunting gear over the ground from one place of application to another, the driving wheel 10 and the auxiliary wheel 3 are in one plane. The shunting gear can easily be moved on the ground by means of its engine 8 through the aforedescribed speed varying gear, and during such movement it is guided by the operator by means of the handle 2, the operator walking behind the wheel 10.

Figure 3:
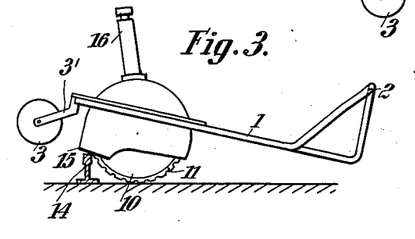
Figure 3A:
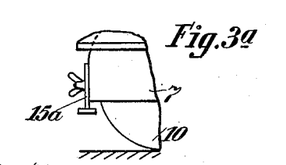
Fig. 3a illustrates an adjustable means for facilitating the mounting of the gear on the rail.

When the shunting gear arrives at the place of application, e. g. between two cars W (Fig. 7) standing close together, and is moved up to the rail, the handle 2 is depressed as illustrated in Fig. 3, so that the auxiliary wheel 3 passes clear over the rail head and an edge 15 on the front of the helmet-shaped casing 7 becomes seated on the rail head against which the driving wheel 10, which is now located transversely to the rail, is simultaneously applied. (Instead of having the edge 15 directly on the front edge of the casing 7, a vertically adjustable stilt 15a (Fig. 3a) may be attached to the casing.) The handle bar 2 is then lifted as shown in Fig. 4 when the auxiliary wheel 3 will be positioned on the ground between the rails and the shunting gear can be moved forward until the middle of the driving wheel is above the rail.

If desired, an auxiliary prop 40 (Figs. 10 and 11) may be provided, whereby the driving wheel 10 may be positively prevented from overriding the rail head and landing between the rails. The prop 40 is pivoted to the frame 1 at 41 and, by means of a handle 42, is adapted to be rocked by the operator of the shunting gear from the position of rest shown in Fig. 11 into the operative position shown in Fig. 10. The operator raises the handle 42 at the appropriate moment whereby an abutment 43 on the prop 40 is moved to a point under the lowermost point of the driving wheel so that, as the gear is moved forward, it abuts against the rail head (see Fig. 10). Immediately thereafter the prop may be returned into its position of rest.

The driving wheel 10 having been fairly positioned over the middle of the rail, is now slewed around the vertical axis of ring 4 through 90° into the longitudinal vertical plane of the rail by actuating the above-described drives. Such slewing or turning may be easily and rapidly effected even in the restricted space available between the two cars W (Fig. 7). Towards the end of mounting the gear on the rail and during the aforesaid slewing or turning the driving wheel is uncoupled from its engine 8, by rotating gear 36 wheel 36, by means of ring 30 into a position in which its gear shifting cam 36′ is not in contact with any of the gear shifting bars 137, 137′, 137″.

Figures 4, 7:
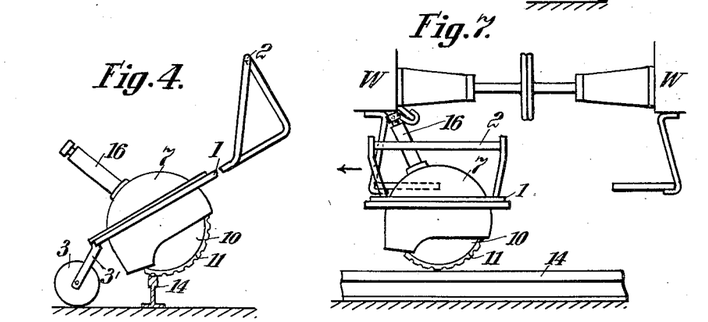
Fig. 7 illustrates the shunting gear during action upon a car.
Figure 6:
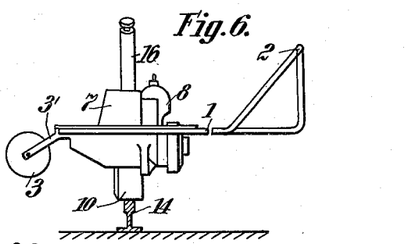
Fig. 6 is a view corresponding to Fig. 5 with the driving wheel turned through 90° into the operative position.

After the driving wheel has been turned into the plane of the rail the shunting gear is moved up to the car to be shunted, a push bar 16 which is fixed to the casing 7 and is adjustable in length being thereby applied to the lower cross frame member of the car as shown in connection with the left-hand car in Fig. 7, in which case shunting to the left will be effected. It is obvious that by turning the wheel 10 from the mounting position shown in Fig. 5 through 90° in the opposite direction the shunting gear may be utilized for shunting in the opposite direction.

The reaction pressure between the bar 16 and the car W presses the driving wheel 10 upon the rail, so that the shunting gear is able to produce a strong pushing action in spite of its comparatively small weight.

Figure 14:
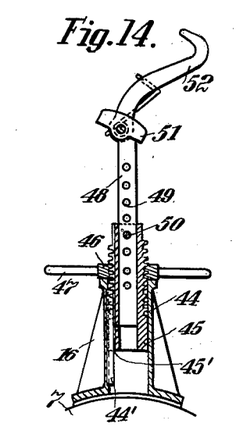
Fig. 14 illustrates, in side elevation and partly in section, a push bar which is adjustable within wide limits.

Owing to the considerable variations in the size of the cars W to be shunted, in their load and to difficulties of the track it is necessary for the push bar 16 to have considerable longitudinal adjustment. It must not be positioned too flat because in that case the traction of wheel 10 would not be sufficient; on the other hand, it must not be too steep, because in that case no pushing action against the car can result. A push bar 16 which takes account of these conditions is illustrated in Fig. 14. A threaded spindle 45 is slidably mounted in a sleeve 44 secured to the casing 7 but prevented from rotation by conventional means, such as a key 44′ engaging a groove 45′ in spindle 45. The sliding of the spindle is effected by means of a nut 46, which in the example is rotatable by means of spider 47. Mounted in the spindle 45 is a bar 48 which is slidable by hand and is provided with a row of spaced holes 49. By pulling out bar 48 to a greater or smaller extent from the spindle and passing a pin 50 through one of the holes 49 and through a corresponding hole at the upper end of the spindle the proper length of the push bar may be rapidly adjusted. At the upper end the bar 48 carries a car pushing head 51 and a spring controlled hook 52 which facilitates its attachment. While by adjusting bar 48 in spindle 44 a coarse adjustment can be effected prior to attachment to the car, the threaded spindle 44 allows of a fine adjustment during operation, even after the load has been applied.

Figure 15:
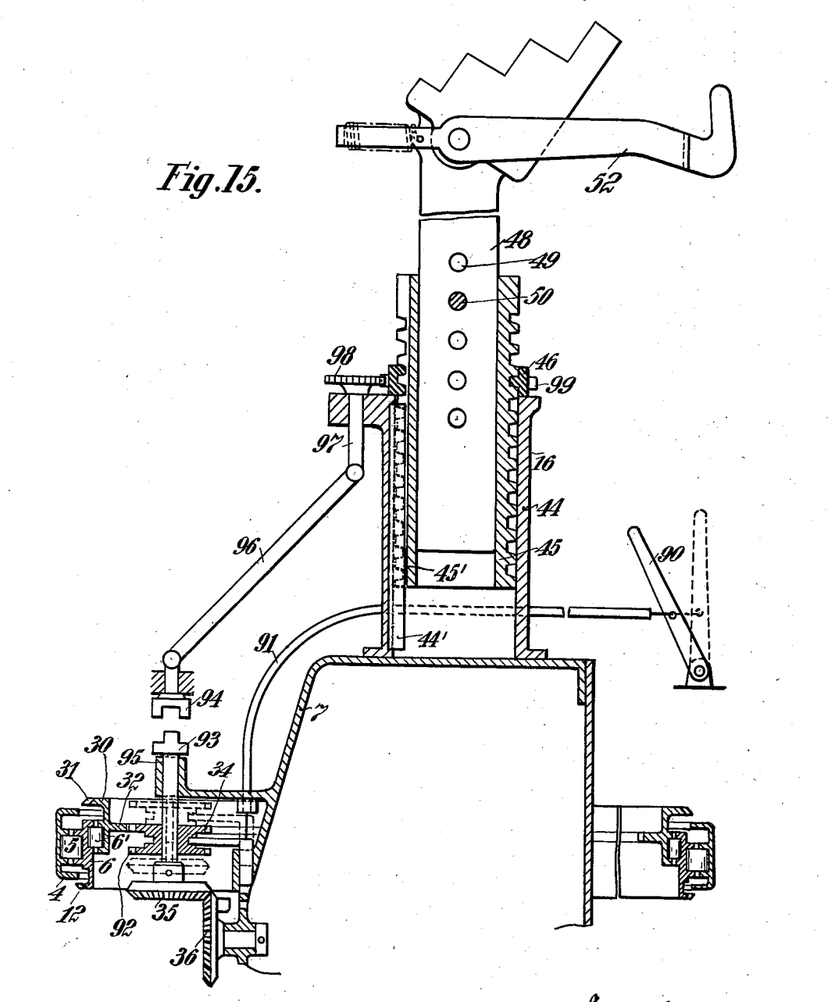
Fig. 15 shows an arrangement for adjusting the push bar from the guiding handle.

By the arrangement diagrammatically illustrated in Fig. 15 it is possible to adjust the push bar from the handle 2 after the shunting gear has been attached to the car, so that the operator on observing that the bar tends to position itself too steeply is enabled to effect an immediate lengthening thereof. For this purpose the above-mentioned gear 34 meshing with internally toothed rim 32 of ring 30 is arranged so it can be lifted together with bevel gear 35 by means of a lever 90 mounted on the handle bar 2 and connected to the wheel 34 by means of a Bowden cable 91, so that the gears 32 and 34 as well as the gears 35 and 36 are thrown out of mesh. During further upward movement of gear 34 a second gear 92 which is integral with gear 34 is thrown into mesh with the toothed rim 32 and is simultaneously connected through a coupling 93, 94 to a Cardan shaft 95, 96, 97 mounted in the casing 7 and on the part 16 thereof. The Cardan shaft has a gear 98 at the other end meshing with a gear 99 formed on the nut 46. After said coupling has been engaged the operator is able to adjust the push bar as desired with the aid of the mechanism for rotating the ring 30.

Figure 10:
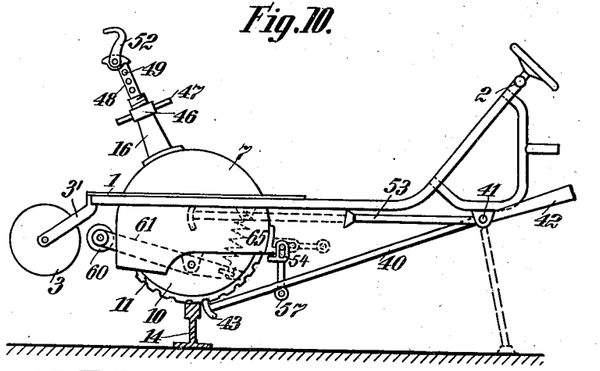
Fig. 10 is a side elevation, on a slightly larger scale, of a modified form of shunting gear incorporating various auxiliary devices.
Figure 11:
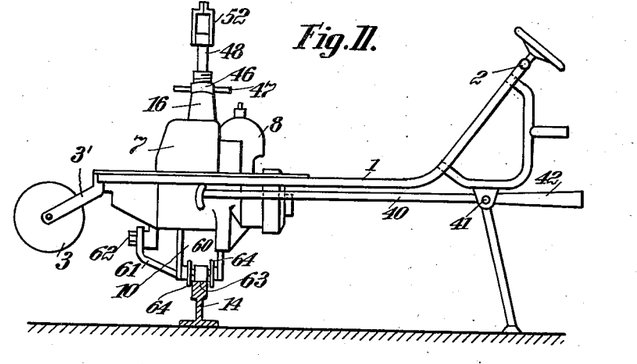
Fig. 11 is a corresponding view after the driving wheel has been turned into the longitudinal plane of the rail.

To enable the operator to more easily effect adjustments as desired, the shunting gear is provided according to Figs. 10 and 11 with a pivoted support or strut 53 in the vicinity of the handles 2a. Such support may also be utilized with advantage when the shunting gear is not in use.

Figure 13:
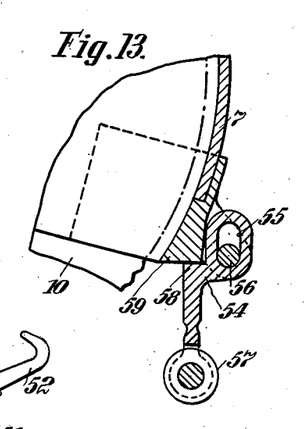
Fig. 13 shows, in side elevation and on a larger scale, an auxiliary device for preventing the push bar from being adjusted into a too steep position.

In order to prevent the shunting gear from moving so close up to the wagon that the push bar 16 is too steeply positioned, and particularly to avoid the danger of the push bar reaching a vertical position, the rear edge of the casing 7 is provided in the embodiment illustrated in Figs. 10 and 11 with a spur 54 shown on a larger scale in Fig. 13. This powerfully built spur is mounted by way of an elongated aperture 55 on a pivot 56 fitted to the casing 7 and normally it is free to swing rearwardly. When, however, the push bar reaches a certain stage in its approach to the vertical position a roller 57 mounted at the lower end of the spur contacts with the rail thereby lifting the spur and causing a shoulder 58 of spur 54 to abut against a nose 59 on the casing, whereby the entire device is prevented from being set at too steep an angle.

Figure 13A:
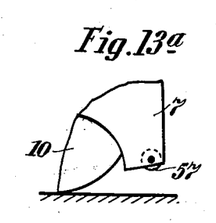
Fig. 13a shows another embodiment of this device.

In some cases it is sufficient to mount the roller 57 on a suitable downward extension of the casing 7, as shown in Fig. 13a, the pivoted spur being omitted, since upon application of the roller to the rail the forward pushing forces are so drastically reduced that the operator will thereby be warned as to the push bar not being properly adjusted.

No particular attention is ordinarily required on the part of the operator for keeping the wide driving wheel 10 on the rail head. To increase security, for example on small radius rail curves, the casing 7 may be provided with a guide roller 60 (Figs. 10 and 11) mounted at one end of a rockable lever 61 pivoted to the casing at 62 and preferably formed of a centre part 63 and two flange discs 64. A spring 65 acting upon the lever 61 may be utilized for resiliently applying the roller to the rail, so that the same retains its guiding action at various angular positions of the push bar. Means such as a draw cable (not shown) may be provided for pulling up the roller into the inoperative position shown in Fig. 10 against the action of the spring 65, the arrangement being such that this can be accomplished from the handle bar 2. This may become necessary when approaching track points or a frog along the line.

Figure 11A:
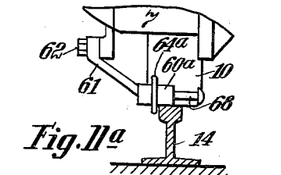
Fig. 11a shows a modified construction of one of the auxiliary devices.

Fig. 11a shows another embodiment of the guide roller. In this case a long horizontal pin 68 is provided at the end of the arm 61 pivoted at 62, and a comparatively long roller 60a with a central flange 64a is slidable on the pin 68, so that the flange will guide either on the inner side of the rail head after the manner of the ordinary tyre flange, or (after the pin 68 has been displaced) on the outer side.

Figure 12:
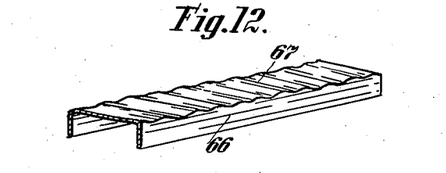
Fig. 12 is a perspective view of an auxiliary device used for mounting in unfavourable weather (when the rails are wet, etc.)

Fig. 12 illustrates an auxiliary device 66 consisting of a U-section trough with corrugated or otherwise roughened web portion 67. This trough fits the rail head and is utilized for mounting on the rail during inclement weather (e. g. when there is snow or ice on the rail). After the shunting gear has mounted the rail this trough is placed before the driving wheel 10 and affords a good grip therefor. By this means it is also possible to move off standing cars under difficult conditions, and once a car is on the move it is possible to keep it going even in bad weather by means of the shunting gear.

Having thus described my invention, what I claim as new and desire to secure by Letters Patent of the United States is:—

1. In a power driven shunting gear for pushing railway vehicles on the rails, the arrangement of a casing, means on said casing for applying it against the railway vehicle, a prime mover supported on said casing, a single wheel adapted to run on the ground as well as on rails and having substantially horizontal bearings, for serving as the sole vertical support for said casing, and for bracing in its forward motion the casing against the vehicle, means for transmitting the power generated by the said prime mover to said wheel, and a frame vertically supported only by said casing and having means for laterally supporting the said casing and said wheel.

2. In a power driven shunting gear for pushing railway vehicles on the rails, the arrangement of a casing, a prime mover supported on said casing, a single wheel adapted to run on the ground as well as on rails and being disposed within said casing and having substantially horizontal bearings for serving as the sole vertical support for said casing, means for transmitting the power generated by the said prime mover to said wheel, a frame surrounding the said casing and being vertically supported only by said casing and having means for laterally supporting it, means on said frame for positively rotating the said casing about a substantially vertical axis relatively to the said frame, and means on said frame by which the operator can balance and guide said frame.

3. In a power driven shunting gear for pushing railway vehicles on the rails, the arrangement of a casing, a prime mover supported on said casing, a single wheel adapted to run on the ground as well as on rails and having substantially horizontal bearings for serving as the sole vertical support for said casing, means for transmitting the power generated by said prime mover to said wheel, a frame surrounding the said casing for laterally supporting it and including an annular portion surrounding said casing, guiding handles on said frame for holding the said annular portion in the desired position, a ring for supporting said casing in said annular frame portion so as to be rotatable about the axis of said annular frame portion, means adjacent to said guiding handles for rotating said ring with respect to said frame through any desired angle, means adjacent to said guiding handles for locking said ring to said annular frame in any desired relative angular position, and a push bar fixed to the said casing and adapted to cooperate with the vehicle body to be pushed when said bar is in a position inclined against the vertical.

4. In a power driven shunting gear for pushing railway vehicles on the rails, the arrangement of a casing, a single wheel adapted to run on the ground as well as on the rails and disposed within said casing and having substantially horizontal bearings for vertically supporting said casing, an internal combustion engine supported by said casing and including a crank shaft axially alined with said wheel, a variable speed gear having a plurality of gear trains for the desired speeds and being disposed within said wheel and a friction clutch between said crank shaft and the power input shaft of said variable speed gear, a gear case for said gear trains disposed within said wheel and fixed to the casing surrounding said wheel, an internally toothed spur wheel fixed to the inner periphery of said wheel, an output spur gear in said variable speed gear in mesh with said internally toothed spur wheel for transmitting the engine power to said wheel, and a hand-controlled frame operatively connected with said outer casing for laterally supporting it.

5. In a power driven shunting gear for pushing railway vehicles on the rails, the arrangement of a casing, a single wheel adapted to run on the ground as well as on the rails and disposed within said casing and having substantially horizontal bearings for vertically supporting said casing, an internal combustion engine supported by said casing and including a crank shaft axially alined with said wheel, a variable speed gear having a plurality of gear trains for the desired speeds and being disposed within said wheel and a friction clutch between said crank shaft and the power input shaft of said variable speed gear, a gear case for said gear trains disposed within said wheel and fixed to the casing surrounding said wheel, an internally toothed spur wheel fixed to the inner periphery of said wheel, an output spur gear in said variable speed gear in mesh with said internally toothed spur wheel for transmitting the engine power to said wheel, and a hand-controlled frame operatively connected with said outer casing for laterally supporting it, and a plurality of clutches within said speed gear, one for each speed gear train for connecting the desired gear train to said output spur gear, and means on said frame for controlling said gear clutches at will.

6. In a power driven shunting gear for pushing railway vehicles on the rails, the arrangement of a casing, a single wheel adapted to run on the ground as well as on the rails and disposed within said casing and having substantially horizontal bearings for serving as the sole vertical support for said casing, an internal combustion engine supported by said casing and including a crank shaft axially alined with said wheel, a variable speed gear having a plurality of gear trains for the desired speeds and being disposed within said wheel and a friction clutch between said crank shaft and the power input shaft of said variable speed gear, a gear case for said trains disposed within said wheel and fixed to the casing surrounding said wheel, an internally toothed spur wheel fixed to the inner periphery of said wheel, an output spur gear in said variable speed gear in mesh with said internally toothed spur wheel for transmitting the engine power to said wheel, and a hand-controlled frame surrounding said outer casing for laterally supporting it, and a plurality of clutches within said speed gear, one for each speed gear train for connecting the desired gear train to said output spur gear, and means on said frame for controlling said gear clutches at will, said frame including an annular portion, a ring rotatably mounted therein, means for supporting said casing in said ring to rotate on the axis of said annular frame portion, means on said frame for manually controlling the rotation of said ring and said casing to adjust said single wheel into the desired angular position with respect to said frame, and means for locking said ring with respect to said annular frame portion, and a push bar on said casing adapted to engage the vehicle to be pushed when the bar is inclined against the vertical.

7. In a power driven shunting gear for pushing railway vehicles on the rails, the arrangement of a casing, means on said casing for applying it against the railway vehicle, a prime mover supported on said casing, a single wheel adapted to run on the ground as well as on rails and having substantially horizontal bearings, for serving as the sole vertical support for said casing and for bracing in its forward motion the casing against the vehicle, means for transmitting the power generated by the said prime mover to said wheel, and a frame vertically supported only by said casing and having means for laterally supporting the said casing and said wheel, said wheel having a segmental tire of elastic frictional material, for producing the necessary friction between the rail and the wheel, and to permit the wheel to climb onto the rail.

HEINRICH CHRISTIANSEN.